United States Patent [19]

Beck

[11] 3,717,307
[45] Feb. 20, 1973

[54] METHOD OF PREPARING REGRIND
[76] Inventor: Erich Beck, Niedesheimer Pfad 25, Worms-Weinsheim, Germany
[22] Filed: Jan. 27, 1971
[21] Appl. No.: 110,122

[30] Foreign Application Priority Data

Feb. 6, 1970 Germany...............P 20 05 360.5

[52] U.S. Cl. ............241/24, 241/15, 241/46.11
[51] Int. Cl. .............................................B02c 13/06
[58] Field of Search..........241/15, 21, 24, 27, 38, 46, 241/46.04, 46.06, 46.11, 46.17, 69, 73, 74, 79, 79.2

[56] References Cited
UNITED STATES PATENTS 2,265,936  12/1941  Cowles..............................241/46 R
2,289,612  7/1942  Wells................................241/46 R
2,879,005  3/1959  Jarvis..............................241/27 X
3,595,488  7/1971  Blakley.............................241/21

Primary Examiner—Granville Y. Custer, Jr.
Attorney—Karl F. Ross

[57] ABSTRACT

A method of preparing injection-molding, blow-molding and extrusion-molding residues, wastes and used thermoplastic materials for further forming which involves the comminution of the plastic simultaneously with the washing thereof, to remove soil, in a washing liquid.

5 Claims, 2 Drawing Figures

PATENTED FEB 20 1973

3,717,307

Erich Beck
INVENTOR.

BY

Karl F. Ross
Attorney

METHOD OF PREPARING REGRIND

FIELD OF THE INVENTION

The present invention relates to the preparation of a raw material for a synthetic-resin-forming process and, more particularly, to the preparation of regrind.

BACKGROUND OF THE INVENTION

Regrind is a comminuted thermoplastic product generally made from the waste material such as sprues, runners, parisons, reject parts and defective or damaged formed bodies of injection-molding, blow-molding or extrusion-molding systems, used scrap material and the like. Regrind is commonly combined with pure synthetic-resin material, i.e. the virgin compound, and is subjected to remolding by any of the aforementioned systems. The regrind is customarily produced by shredding, grinding or granulating the thermoplastic waste.

Certain synthetic-resin residues, especially thermoplastic foils, blow-molded or deep-drawn hollow articles and injection-molded articles, scraps and pieces are frequently contaminated with residues (hereinafter referred to as soil) which render the thermoplastic scraps unsuitable for use in regrind. In order to obtain some value from the soiled thermoplastic scraps, it has been proposed to wash the relatively large pieces at high pressure and velocities of the washing liquid. However, the expense of the washing process and the inability to carry it out with a minimum of labor, have decreased the value of such thermoplastic scrap and prevented a valuable source of raw material from being effectively utilized.

OBJECTS OF THE INVENTION

It is, therefore, the principal object of the present invention to provide a method of preparing regrind, i.e. a method of reclaiming thermoplastic scrap material, which permits of the use of soiled or contaminated thermoplastic materials which have not been utilizable for the purpose earlier.

Another object of this invention is to provide a low-cost method of reclaiming soiled or contaminated thermoplastic raw materials.

Still another object of this invention is to provide an improved method of making thermoplastic bodies with increased economy.

SUMMARY OF THE INVENTION

These objects and others which will become apparent hereinafter, are attained, in accordance with the present invention, in a process for the purposes described, which involves the simultaneous washing and comminution of soiled thermoplastic scraps. More specifically, it has been discovered that the shredding, granulating or grinding of thermoplastic scraps, especially foils, sheets and blow-molded, deep-drawn and injection-molded articles which may have been contaminated or soiled in the molding process or upon discard therefrom, may be shredded in the presence of a washing liquid and simultaneously comminuted and cleaned such that, when the comminuted product is separated from the washing liquid, the thermoplastic powder is free from the contaminant.

The invention is based upon a remarkable phenomenon, namely, the interaction between the comminuter blades (especially when the latter are the radial blades of a rotatory-blade comminutor which cooperate with stationary blades of the walls of the comminuting vessel) and the washing liquid such that a greater proportion of soil and contamination from the thermoplastic scraps is transferred to the liquid than is possible with the most rigorous washing method used heretofore. Furthermore, the presence of the washing liquid does not reduce significantly the comminuting efficiency of the apparatus and, in fact, appears even to improve the quality of the comminuted product by rendering the same, after drying, more easily flowable and combinable with the virgin compound. We believe that these latter results derive from the presence of a viscous medium at the moment of comminution.

The invention has been found to introduce a considerable saving in the handling of the thermoplastic waste material and to allow the use of synthetic resins of a closed form (e.g. bags, sacks, receptacles, containers) which may be contaminated internally and externally and which could not be adequately cleaned heretofore even with expensive conventional processes.

According to still another feature of the invention, the thermoplastic material is comminuted in the presence of a washing liquid which may be discharged during comminution after a washing period which may be longer or shorter depending upon the degree of soiling or contamination. In general, the combined washing and comminution step may range from a period of 15 seconds to a period of 15 minutes. Upon discharge of the washing liquid, it is found that the comminuted material retains by adhesion some 20 to 30 percent of the wash liquid originally used. It has been found advantageous, in this case, to transfer the moist comminuted mass into a centrifuge and to have the comminuting device connected directly thereto. The centrifuge reduces the water content of the comminuted material to 2 to 5 percent, whereupon the product can be delivered to a drying and agglomerating stage of any conventional type (e.g. that marketed under the name Zerglomat) prior to use in an extrusion or other molding system.

The thermoplastics with which the system of the present invention is operable, include the nylon-type polyamides, polycarbonates, polyethylenes, polypropylenes, polyacrylates, polystyrenes, acrylonitryle polymers, copolymers and terpolymers, polyvinyl chlorides, thermoplastic polyesters, vinyl acetate polymers and copolymers and vinyl fluoride polymers and copolymers. The washing liquid is preferably water and may be used in a liquor ratio (volume rating of washing liquid to thermoplastic) of 1 : 1 to 1 : 200 or more, the latter value being determined only by the availability of the washing liquid and a means for its disposal. The washing liquid may contain substances facilitating the removal of soil or contaminants, e.g. soaps or detergents and best results are obtained with such detergents as sodium alkyl benzene sulfonates in which the alkyl group contains from 6 to 9 atoms, and soaps such as sodium stearate. The soap may be used in amounts ranging between 0.01 to 5 percent by weight of the washing liquor. The washing temperature may be ambient temperature (say, 20° to 30°C) although higher temperatures may develop within the comminuting vessel without detriment.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
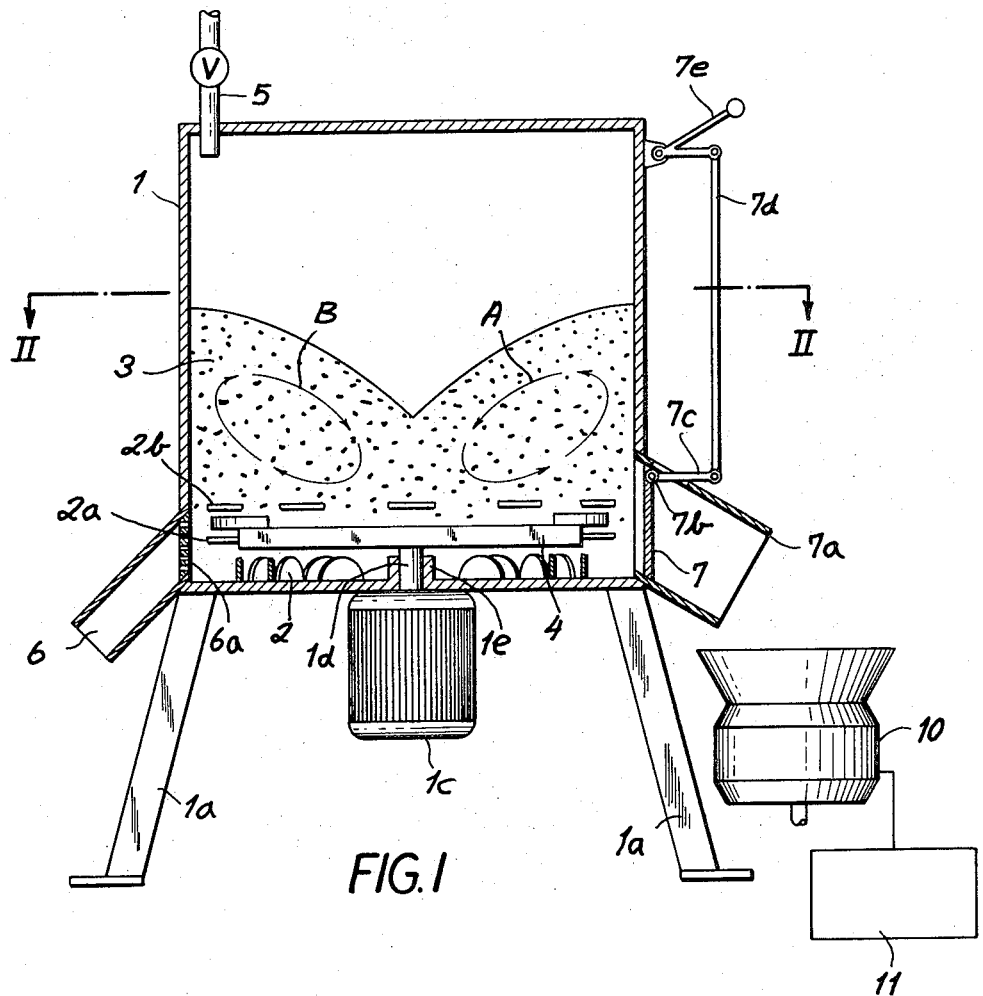
FIG. 1 is a vertical cross-sectional view of a comminuting apparatus embodying the present invention.
Figure 2:
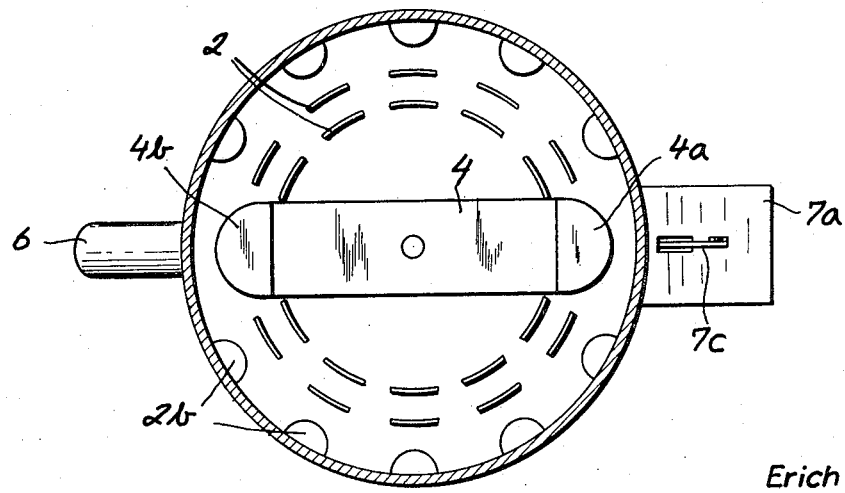
FIG. 2 is a cross-sectional view taken along the line II — II of FIG. 1.

In FIGS. 1 and 2 of the drawing, there is shown a cylindrical vessel 1 mounted upon the legs 1a and having a bottom on which a motor 1c is fastened, the shaft 1d of the motor passing through a seal 1e in the bottom and being connected to a rotary blade 4 of the comminuting device.

Along the inner surface of the floor of the vessel, there are provided upstanding blades 2 in two annular arrays of angularly equispaced blades, the arrays being concentric with one another and coaxial with the shaft 1d. The blades reach upwardly to a point just below the radial blade 4 with which they co-operate.

In addition, substantially at the level of the blade 4 and preferably flanking the latter above and below, there are provided additional arrays of blades 2a and 2b mounted along the innerwall of the vessel and similarly spaced therearound. As can be seen from the drawing, each of the blades 2, 2a and 2b is of arc-segmental configuration. The blades 2a, of course, lie in a horizontal plane just below the semicircular blade tips 4a and 4b carried by the arms 4, and reach inwardly substantially to the orbit of these tips. The blades 2b, of course, lie in a horizontal plane just above the tips 4a and 4b of the rotary-knife beam 4.

The top of the vessel 1 may be open and is provided with a valved supply pipe 5 adapted to deliver the wash liquid, e.g. water, to the vessel, the thermoplastic scrap being introduced through the top and being represented at 3 in FIG. 1. Rotation of the rotary blade system 4, 4a, 4b by the motor, comminutes the scrap and casts the scrap outwardly to produce a circulation represented generally by arrows A and B, as the scrap is broken down into smaller and smaller pieces by shearing engagement with the blades 4, 4a, 4b and 2, 2a, 2b, the shearing action giving rise to formation of platelets. When the particles have reached a maximum dimension of 5 cm, e.g. corresponding to a particle diameter of 5 cm, the wash liquid is supplied and comminution continued. The wash liquid is permitted to drain through a valved outlet 6 via a perforated plate 6a with washing being carried out until the wash liquid is clear. At this point, the flap 7, at a downwardly inclined chute 7a is swung upwardly about the pivot 7b by an arm 7c connected by a link 7d to an actuating level 7e. The particles, now in the form of platelets, are then introduced into a centrifuge 10 and thereupon dried. From the centrifuge, the particles may be introduced into a granulating stage 11 preparatory to be used.

Example 50 kg of polyethylene scrap of varying sizes, obtained as blow molding residues and contaminated both internally and externally as a result of storage on the floor of a blow-molding plant, is introduced into the apparatus illustrated in FIGS. 1 and 2 with a capacity of 100 liters. The rotary blades were driven at a speed of about 2000 rpm. for a period of several seconds, thereby comminuting and shredding the scrap until a maximum density of 5 cm was realized. At this point, wash water at ambient temperature was introduced in a quantity sufficient to cover the shredded scrap and the blade rotation continued. The wash water containing 0.1 percent of sodium alkyl benzene sulfonate with an alkyl group carbon number of eight. Washing continued until the liquid was clear, corresponding to a washing time of several minutes. When the material was drained, it was found to be in the form of platelets with a wide distribution of sizes and a maximum dimension of several millimeters. The size range was upwardly of 50 microns. The moisture content was about 25 percent and was reduced to 5 percent by centrifugation, whereupon the product was dried, granulated and mixed with polyethylene powder for the production of new film by extrusion. Similar results were obtained with vinyl chloride, vinyl acetate, styrene, propylene and ester-type polymers.

I claim:

1. A method of reclaiming scrap thermoplastic material, comprising the steps of comminuting scrap thermoplastic material in a washing liquid to clean the scrap material simultaneously with the subdivision thereof; draining said liquid from the subdivided material; and centrifuging the subdivided material to separate the subdivided material from residual liquid.

2. The method defined in claim 1, further comprising the steps of drying and granulating the centrifuged subdivided material.

3. The method defined in claim 2 wherein the liquid is water.

4. The method defined in claim 3 wherein said liquid contains a surface-active agent.

5. The method defined in claim 3 wherein said liquid is passed through said material during the comminution thereof until the effluent liquid is clear.

* * * * *